United States Patent [19]
Totman

[11] 3,912,307
[45] Oct. 14, 1975

[54] FLANGED JOINT SEALING NUT
[75] Inventor: Mirrel L. Totman, McPherson, Kans.
[73] Assignee: Edward L. Brown, Middletown, Ohio ; a part interest
[22] Filed: May 21, 1973
[21] Appl. No.: 362,371

[52] U.S. Cl. .................. 285/382; 85/35; 285/286; 285/405; 285/DIG. 18
[51] Int. Cl.² .................................... F16L 13/14
[58] Field of Search ............ 285/15, 382, 368, 363, 285/412, 405, 343, 286, DIG. 18; 151/19 R; 85/32, 35

[56] References Cited
UNITED STATES PATENTS
3,152,816  10/1964  Smith .......................... 285/15
3,603,616   9/1971  Smith .......................... 285/15

FOREIGN PATENTS OR APPLICATIONS
575,447   4/1958  Italy ......................... 151/19 R Primary Examiner—Dave W. Arola
Attorney, Agent, or Firm—Edward L. Brown, Jr.

[57] ABSTRACT

An improved method and structure for repairing, without shut-down, leaking flanged joints on piping by means of a closed-end, bevel-faced nut which when substituted in place of conventional flange bolts, forms its own seal in the flange bolt hole.

1 Claim, 2 Drawing Figures

FLANGED JOINT SEALING NUT

BACKGROUND OF THE INVENTION

Piping in refineries, chemical plants, and other fluid processing plants is joined in many places by flanged joints. On the ends of pipe, valves and fittings, a flange stands out from the pipe with a row of bolt holes near its outer perimeter and axially parallel to the pipe. The face of the flange, between the bolt holes and the pipe opening, is a surface adapted to confine a gasket between this flange and a similar flange on an adjoining section. Though called bolts, the threaded members are usually a threaded stud with a nut on each end to draw the two flanges toward each other exerting sufficient pressure on the gasket to seal the joint. Such piping operates under varying pressures and temperatures. When a leak develops through the gasket it is often inconvenient to shut down the line for repairs. Left alone the leak becomes progressively worse. Therefore the leak is often repaired "on stream", which is without depressurizing the line even though the escaping fluid may be hot or flammable or both.

DESCRIPTION OF THE PRIOR ART

One such repair method and apparatus is shown in U.S. Pat. No. 3,550,638. Another method and one that is in use is to first weld a steel band to the perimeter of the two flanges thereby sealing the outer gap between the pair of flanges. Secondly, for each bolt, one at a time, substitute a bar of same diameter as the bolt and long enough to extend beyond each flange, then fillet weld each end of the bar to the flanges. This completes the repair of the joint. While this sealing is going on it is often necessary to conduct the leaking fluid away for the safety of the welder and to avoid having holes blown through molten weld metal.

It is an object of this invention to save time and money in repairing a leaking flanged joint on stream by using nuts which will seal the threads and seal the contact between nut and flange.

Another object of this invention is to decrease the repairman's exposure to heat and hazard by use of quickly installed nuts and studs instead of the more time consuming selds at bolt holes.

A further object of this invention is to reduce the likelihood of a more damaging leak by sealing the leak with metal in less time than possible under present methods.

These and other objects and advantages of the present invention are specifically set forth in or will become apparent form the following detailed description of preferred forms of the invention when read in conjunction with the accompanying drawings, wherein.

DESCRIPTION OF THE PREFERRED EMBODIMENT

Figure 2:
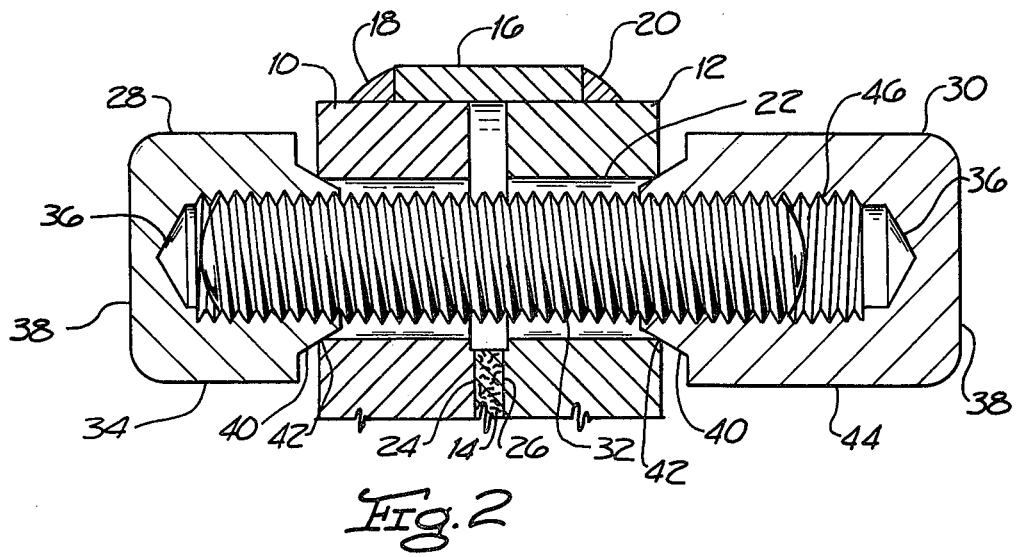
FIG. 2 is a fragmentary section to an enlarged scale taken on line 2 — 2 of FIG. 1.
Figure 1:
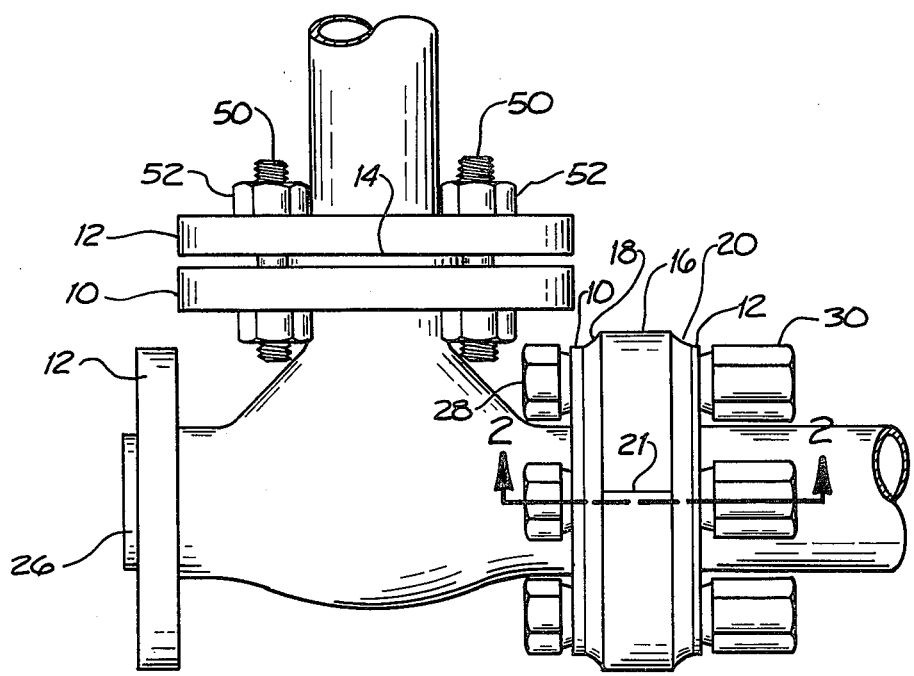
FIG. 1 is an elevational view of a flanged pipe connection.

On one of the flanged joints of FIG. 1 is shown the conventional stud and nut 50 and 52 used in a standard flanged connection while the other flanged joint illustrates the replacement nuts of the present invention.

The invention contemplates that the space between the flanges 10 and 12 is sealed along their outer rim by welding a steel band 16 with welds 18 and 20, joining the band into a full circle by one or more welds 21, or sealing this space around the outer rim by other means such as that shown in U.S. Pat. No. 3,550,638.

The sealing operation facilitated by the present invention is that of the bolt holes 22 around the pipe flanges 10 and 12. Depending on the size of the flanged joint, there are four to 24 or more bolts joining the flanges 10 and 12 and compressing gasket 14 between seats 24 and 26. When a leak occurs through gasket 14, the escaping fluid passes between the open space between flanges 10 and 12. When this space is closed by welded band 16, or other means, the fluid still escapes through bolt holes 22. This leakage is between nuts 52 and flange 12 and also along the threads between studs 50 and nuts 52. These openings or bolt holes 22 are sealed by removing, one at a time, studs 50 and substuting the next smaller diameter stud 32 and two closed-end beveled sealing nuts 28 and 30. To provide some latitude in length of studs, it is more practical to provide one sealing nut 28 of normal thread length and a second sealing nut 30 with additional thread length 46. The outer ends 38 of sealing nuts 28 and 30 are located to leave enough metal between outer surface 38 and the end of recess 36 to withstand the pressures within the pipe. It is convenient to use a regular length sealing nut 28 where clearances are tight, as in FIG. 1, and the deeper sealing nut 30 on the other end of stud 32 where there are on obstructions. The outer sides 34 and 44 of sealing nuts 28 and 30 are shaped to be engaged by conventional wrenches. Stud 32 is first placed in the hole 22 and sealing nut 28 is threaded onto stud 32. Then deep sealing nut 30 is placed on the other end of stud 32 and sufficient force is applied by wrench to seat the beveled portions 40 firmly on the rim 42 of the bolt hole bore 22. This pressure reshapes the existing square corner of rim 42 to a beveled surface mating with bevel 40 which can also be reshaped in the process depending on the relative hardness of the respective metals. The result is a tight metal to metal seal between surfaces 40 and 42. Stud 32 is smaller than the original stud 50, to provide that enough of the beveled projection 40 enters the bore 22 before rim 42 begins to exert pressure. The reason for this being to allow the bevel portion 40 to resist the compressive force sufficiently to prevent the threads on the inside of the beveled portion 40 from being forced into the threads of stud 32 with such force that the friction prevents tightening of sealing nut 30 to a seat on rim 42 of the bolt hole bore. If the contact point on the beveled portion was in closer to the end of the nut where the metal was realtively thinner, the deformation of the inside threads would prevent adequate tightening of the nuts. The loss in strength of the joint by substututing studs 32 for the next larger size studs 50 is never critical if the band 16 is welded to flanges 10 and 12 provided that band 16 and welds 18 and 20 are of sufficient size.

Having described the invention with sufficient clarity to enable those familiar with the art to construct and use it, I claim:

1. A bolt hole sealing joint for use on a flanged pipe joint having a pair of abutting metal flange faces with bolt holes therein, comprising:
    a threaded stud receivable in the bolt hole;
    a rim surrounding the bolt hole;
    a metal threaded nut means having a closed outer end, the inner open end having a concentric beveled portion partially receivable in the bolt hole, said beveled portion being harder than the rim of the bolt hole whereby the tightening of the nut causes the rim of the hole to deform against the beveled portion and to conform thereto and thereby create a metal to metal seal therebetween.

* * * * *